US012366055B2

(12) United States Patent
Saito et al.

(10) Patent No.: US 12,366,055 B2
(45) Date of Patent: Jul. 22, 2025

(54) INFORMATION PRESENTATION DEVICE

(71) Applicant: HITACHI CONSTRUCTION MACHINERY CO., LTD., Tokyo (JP)

(72) Inventors: Yuho Saito, Mito (JP); Takaaki Chiba, Tsuchiura (JP); Shinjiro Yamamoto, Inashiki-gun (JP); Shinya Imura, Toride (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 227 days.

(21) Appl. No.: 18/023,460

(22) PCT Filed: Jan. 6, 2022

(86) PCT No.: PCT/JP2022/000208
§ 371 (c)(1),
(2) Date: Feb. 27, 2023

(87) PCT Pub. No.: WO2022/201735
PCT Pub. Date: Sep. 29, 2022

(65) Prior Publication Data
US 2023/0235539 A1 Jul. 27, 2023

(30) Foreign Application Priority Data

Mar. 25, 2021 (JP) ................. 2021-052234

(51) Int. Cl.
E02F 9/26 (2006.01)
G06V 20/52 (2022.01)
(52) U.S. Cl.
CPC .............. *E02F 9/262* (2013.01); *G06V 20/52* (2022.01)
(58) Field of Classification Search
CPC ................................ E02F 9/262; G06V 20/52
See application file for complete search history.

(56) References Cited

U.S. PATENT DOCUMENTS 11,153,503 B1 * 10/2021 Ebrahimi Afrouzi .. H04N 23/74
2019/0132614 A1    5/2019 Kasahara et al.
2020/0327336 A1   10/2020 Seki et al.

FOREIGN PATENT DOCUMENTS

JP    2016181119 A   10/2016
JP    2019151968 A    9/2019
(Continued)

OTHER PUBLICATIONS

Mohammad et al. "Automated annotation for visual recognition of construction resources using synthetic images" (2016) Elsevier See abstract (Year: 2016).*

(Continued)

*Primary Examiner* — Gertrude Arthur Jeanglaude
(74) *Attorney, Agent, or Firm* — MATTINGLY & MALUR, PC

(57) ABSTRACT

An overhead-view image of a work site is presented to an operator of a work machine even when the number of imaging devices at a construction site is lacking. The present disclosure provides an information presentation device for generating and outputting a terrain image relating to a construction site. The information presentation device includes a storage device that stores a program for performing a predetermined imaging process on the terrain image, and a processor for reading the program from the storage device and generating the terrain image. The processor performs: a process of using an image of the construction site acquired by at least one imaging device installed at a construction site, to acquire a first overhead-view image representing a current terrain of the construction site as viewed from above; a process of acquiring a second overhead-view image acquired by a method other than capturing by the imaging device installed at the construction site, and representing an original terrain of the construction site as viewed from above; and an image synthesis process of (Continued)

1 Hydraulic shovel
2 Cabin
3 Travelling device
4 Engine
5 Boom cylinder
6 Arm cylinder
7 Bucket cylinder
8 Boom
9 Arm
10 Bucket
11 Counter weight superimposing the first overhead-view image and the second overhead-view image to generate a first synthesized overhead-view image.

8 Claims, 14 Drawing Sheets

(56) References Cited

FOREIGN PATENT DOCUMENTS

| JP | 2020057981 A | 4/2020 |
|---|---|---|
| WO | 2017187764 A1 | 11/2017 |

OTHER PUBLICATIONS

International Search Report of PCT/JP2022/000208 dated Feb. 8, 2022.

* cited by examiner

1 Hydraulic shovel
2 Cabin
3 Travelling device
4 Engine
5 Boom cylinder
6 Arm cylinder
7 Bucket cylinder
8 Boom
9 Arm
10 Bucket
11 Counter weight

INFORMATION PRESENTATION DEVICE

TECHNICAL FIELD

The present disclosure relates to an information presentation device.

BACKGROUND ART

Conventionally, information presentation devices are known in which, at a construction site where a plurality of machines, such as work machines and transport vehicles, are present, an operator of a work machine is enabled to recognize the position of another work machine or transport vehicle that is present nearby. For example, Patent Literature 1 discloses an information presentation device that: identifies the position of each of a plurality of vehicles based on images captured by a plurality of imaging devices installed at a construction site; and outputs a signal for causing the position of, among the identified vehicles, another vehicle of which the distance from a vehicle designated as desired is less than a threshold value, to be displayed over an overhead-view image of the construction site.

CITATION LIST

Patent Literature

Patent Literature 1: JP 2019-151968 A

SUMMARY OF INVENTION

Technical Problem

However, with the configuration described in Patent Literature 1, it may be difficult to synthesize the overhead-view image when, for example, the number of the imaging devices available at the construction site is limited due to installation cost. This is because an image covering the entire area of the construction site cannot be synthesized. As a result, the plurality of vehicles at the construction site cannot be managed efficiently.

The present disclosure has been made in view of such a circumstance, and proposes a technology for presenting an overhead-view image of a work site to an operator of a work machine even when the number of imaging devices at a construction site is lacking.

Solution to Problem

In order to solve the problem, the present disclosure proposes an information presentation device for generating and outputting a terrain image relating to a construction site. The information presentation device includes a storage device that stores a program for performing a predetermined imaging process on the terrain image, and a processor for reading the program from the storage device and generating the terrain image. The processor performs: a process of using an image of the construction site acquired by at least one imaging device installed at the construction site, to acquire a first overhead-view image representing a current terrain of the construction site as viewed from above; a process of acquiring a second overhead-view image acquired by a method other than capturing by the imaging device installed at the construction site, and representing an original terrain of the construction site as viewed from above; and an image synthesis process of superimposing the first overhead-view image and the second overhead-view image to generate a first synthesized overhead-view image.

Additional features related to the present disclosure will become apparent from the descriptions provided herein and the attached drawings. Aspects of the present disclosure are achieved and realized by elements, various combinations of elements, the following descriptions, and the embodiments set forth in the attached claims. The descriptions provided herein are merely by way of typical examples, and are not intended to limit the scope of the claims or application examples of the present disclosure in any sense.

Advantageous Effects of Invention

According to the present disclosure, an overhead-view image of a work site can be generated and presented to an operator of a work machine even when the number of imaging devices at a construction site is lacking.

DESCRIPTION OF EMBODIMENTS

The first to third embodiments of the present disclosure describe information presentation technologies for generating and outputting an overhead view terrain image of a construction site. In the following, reference is made to the attached drawings to describe the embodiments of the present disclosure. In the attached drawings, functionally similar elements may be shown with similar numerals. While the attached drawings show specific embodiments and implementation examples in accordance with the principles of the present disclosure, these are for facilitating an understanding of the present disclosure, and are not to be used to interpret the present disclosure in a limited sense.

While the present embodiment is described in sufficient detail to enable a person skilled in the art to practice the present disclosure, it is to be understood that other implementations and modes are also possible, and that changes in configuration or structure and various substitutions of elements may be made without departing from the scope of the technical concepts and spirit of the present disclosure. Accordingly, the following description should not be taken in a limited sense.

Further, as will be described below, the embodiments of the present disclosure may be implemented by software running on a general-purpose computer, or may be implemented by dedicated hardware or by a combination of software and hardware.

(1) First Embodiment

<Configuration Example of Overhead-View Image Providing System>

Figure 16:
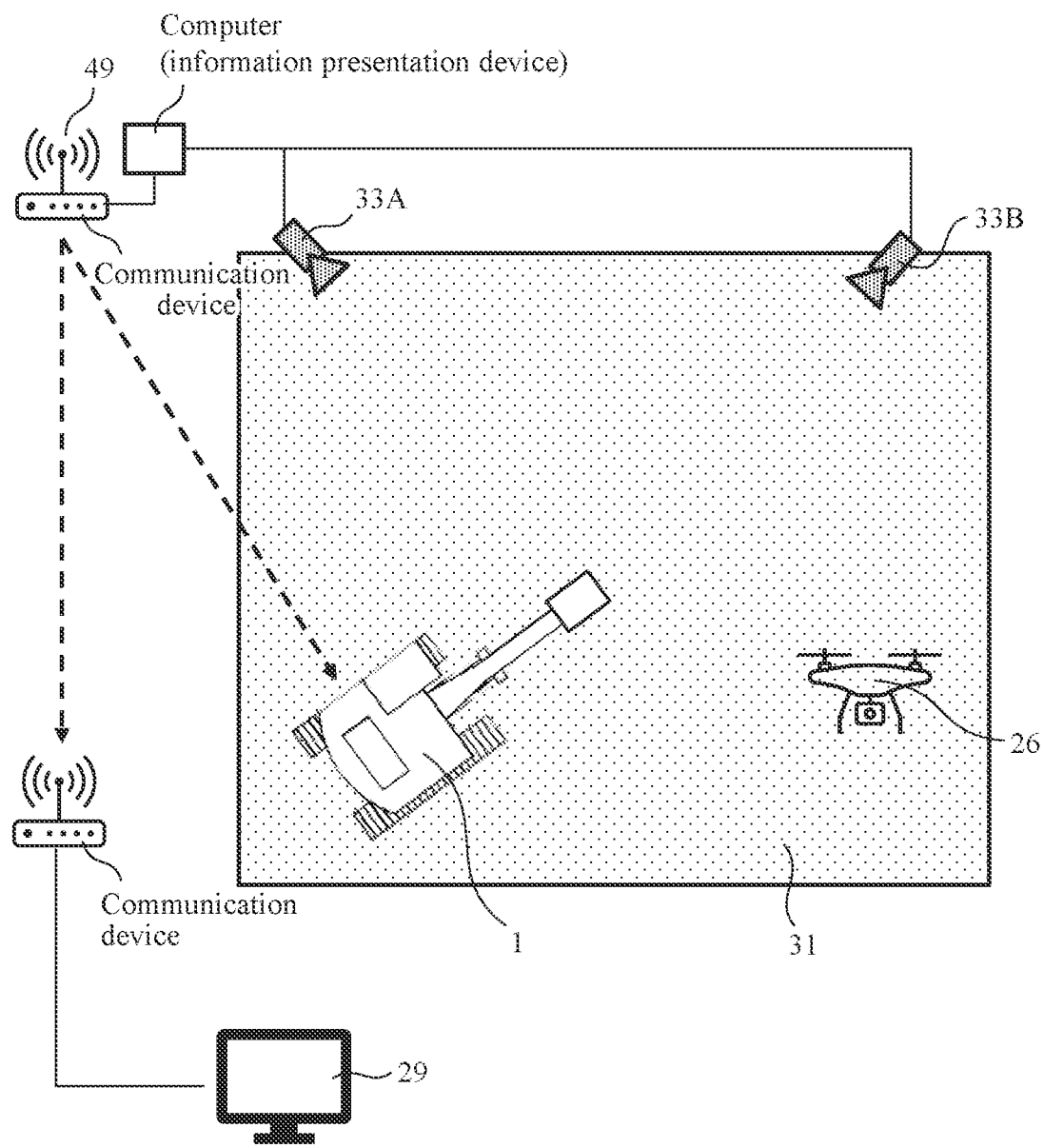
FIG. 16 illustrates a configuration example of an overhead-view image providing system according to the present embodiments (first to third embodiments).

FIG. 16 illustrates a configuration example of an overhead-view image providing system (also referred to as an information providing system) according to the present embodiment (including a second and a third embodiment as will be described below).

The overhead-view image providing system comprises: a work machine 1 having a communication device; at least one imaging device (camera) 33A to 33B installed at a construction site 31; a computer (information presentation device) that generates and outputs various overhead-view images of the construction site 31; a drone (corresponding to an original terrain information acquisition unit 26) for capturing an overhead-view image of an original terrain (the terrain before construction materials and the work machine 1 are arranged therein) of the construction site 31; a display unit (display device) 29 that displays the generated overhead-view image; and a communication device 49.

While the system uses an overhead-view image (Overhead-view image 2 as will be described below) captured by the drone (corresponding to the original terrain information acquisition unit 26), the system may use a satellite image captured by a satellite or the like, as Overhead-view image 2.

In FIG. 16, while the display unit (display device) 29 is disposed remotely from the computer (information presentation device), the display unit 29 may constitute a part of the computer (information presentation device). The computer (information presentation device) may be installed outside (including a remote area) the construction site 31 so that a manager located away from the construction site 31 can confirm the overhead-view image, or the computer may be disposed at the operator's seat of the work machine 1 so that the operator can confirm the overhead-view image (or both). The information presentation device may be disposed outside the construction site 31, and only the display unit 29 may be installed in the work machine 1. When the information presentation device and the display unit 29 are disposed away from each other, as illustrated in FIG. 16, they may be configured to be able to communicate with each other via a network.

<Configuration Example of Work Machine>

Figure 1:
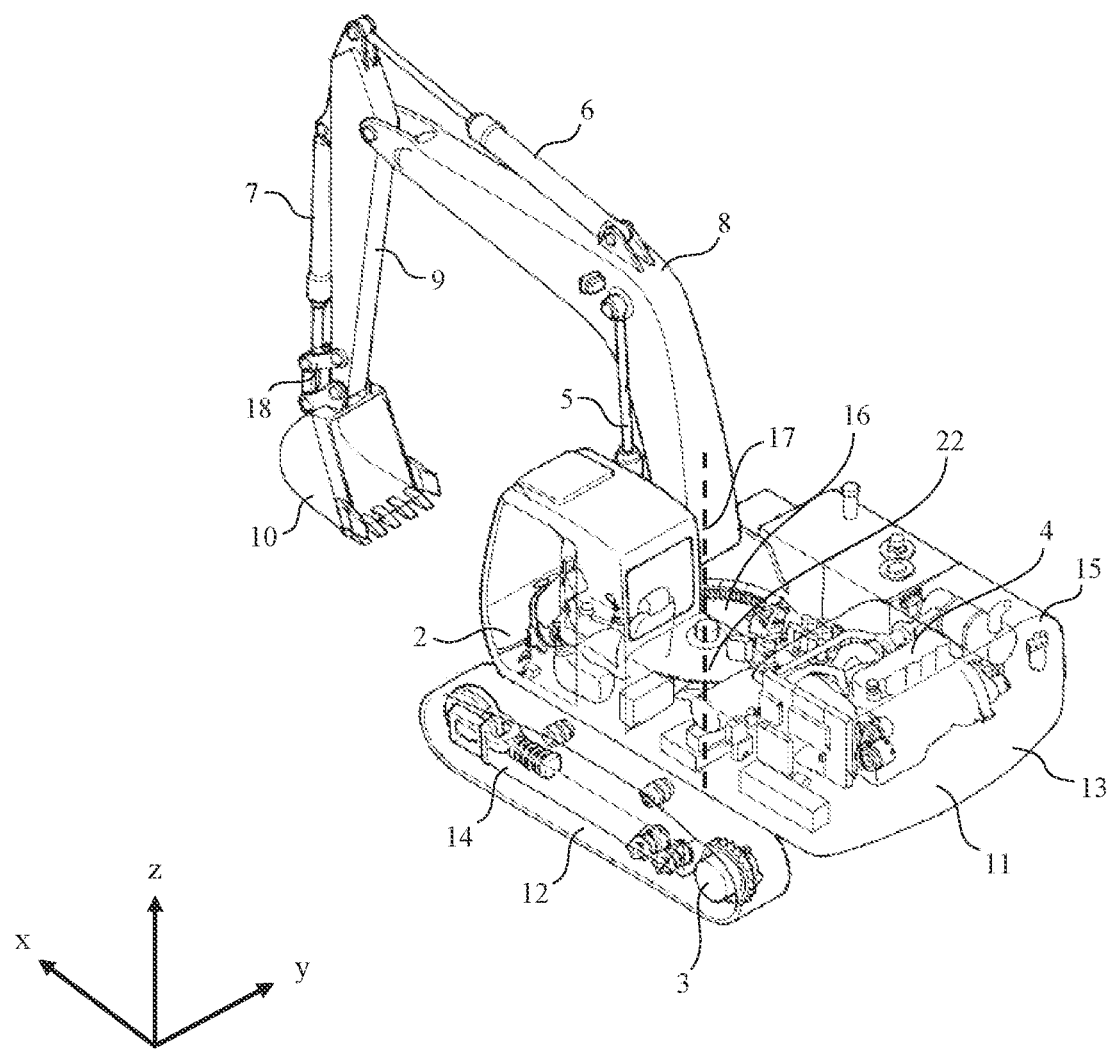
FIG. 1 illustrates a schematic configuration example of a work machine.

FIG. 1 illustrates a schematic configuration example of the work machine. In the present embodiment, a hydraulic shovel 1 is described as an example of the work machine.

The hydraulic shovel 1 is composed of a lower travelling structure 14 on which an upper travelling structure 15 is mounted via a rotating mechanism 16. The rotating mechanism 16 includes a hydraulic motor, and performs a rotating operation of the upper travelling structure 15 in clockwise or anticlockwise direction. The upper travelling structure 15 has a boom 8 attached thereto. The boom 8 is pivotally moved by a hydraulically driven boom cylinder 5 in an up-down direction with respect to the upper travelling structure 15. An arm 9 is attached to the tip-end of the boom 8. The arm 9 is pivotally moved by a hydraulically driven arm cylinder 6 in a front-rear direction with respect to the boom 8. A bucket 10 is attached to the tip-end of the arm 9. The bucket 10 is pivotally moved by a hydraulically driven bucket cylinder 7 with respect to the arm 9. Further, a cab 2 for housing the operator is mounted on the upper travelling structure 15. As used herein, the boom 8, the arm 9, and the bucket 10 may be collectively referred to as a front work unit 23. The front work unit 23 rotates around a center of rotation 17 together with the upper rotating structure 15. Further, the distance from the center of rotation 17 to the tip-end of the front work unit 23 varies as the boom 8, the arm 9, or the bucket 10 is pivotally moved. The upper travelling structure 15 rotates around the center of rotation 17. An attachment 18 is attached to the upper travelling structure 15.

The boom 8 pivotally moves up and down around a center of pivotal motion which is parallel to a y-axis. The arm 9 is attached to the tip-end of the boom 8. The bucket 10 is attached to the tip-end of the arm 9.

For a vehicle body position detection unit 44, an apparatus capable of acquiring an own position, such as a GNSS, is used. An orientation angle of a vehicle body is computed by a vehicle body orientation angle computation unit 43.

<Movable Range of Work Machine>

Figure 2A:
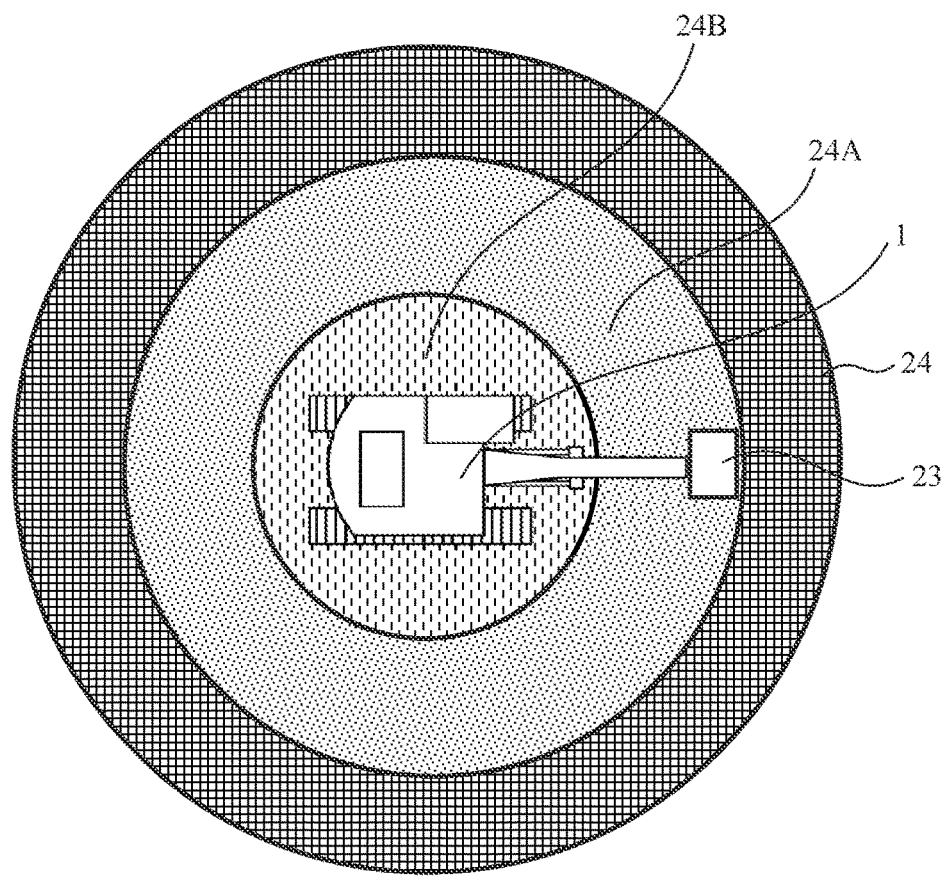
FIG. 2A illustrates a movable range 24 of a hydraulic shovel 1.
Figure 2B:
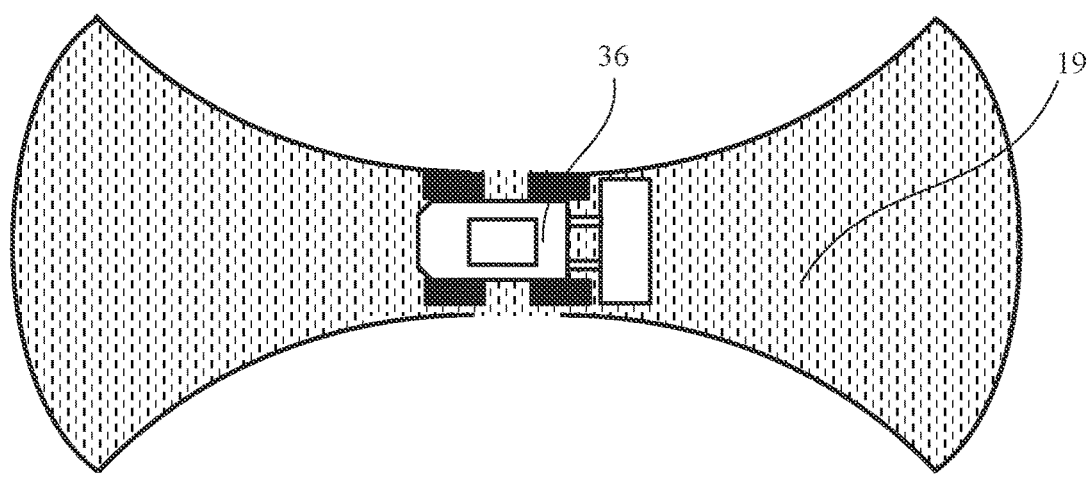
FIG. 2B illustrates a movable range 19 of a wheel loader 36.

FIG. 2A and FIG. 2B illustrate an example of the movable range of the work machine. FIG. 2A shows a movable range 24 of the hydraulic shovel 1. FIG. 2B shows a movable range 19 of the wheel loader 36.

In FIG. 2A, a movable range 24A for the front work unit 23 of the hydraulic shovel 1 is the range that the front work unit 23 can reach as the upper rotating structure rotates 360 degrees when the front work unit is taking the longest pose. Further, the movable range 24B for the lower travelling structure 14 is the range that the vehicle body can reach in T seconds, for example, when the hydraulic shovel 1 travels. A movable range integrating the movable ranges 24A and 24B is defined as the movable range 24 for the hydraulic shovel 1. Further, in FIG. 2B, the movable range 19 of the wheel loader 36 is the range in which the wheel loader 36 can move in the front-rear direction in T seconds with the steering wheel turned to the limit to left or right.

<Functional Configuration Example of Information Presentation Device>

Figure 3:
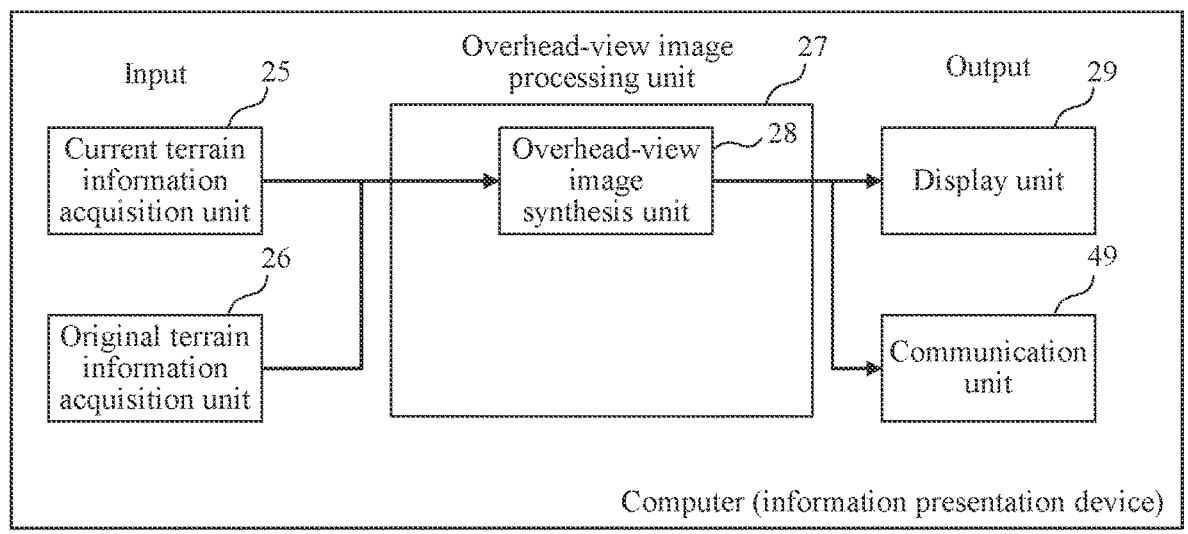
FIG. 3 is a block diagram illustrating a functional configuration example of an information presentation device according to the present embodiment.

FIG. 3 is a block diagram illustrating a functional configuration example of the information presentation device according to the present embodiment.

The information presentation device includes a current terrain information acquisition unit 25, an original terrain information acquisition unit 26, an overhead-view imaging processing unit 27, and the display unit (display device) 29. The overhead-view imaging processing unit 27 includes an overhead-view image synthesis unit 28. The information presentation device is composed of a computer, for example. A processor included in the computer reads from a memory (storage device; same below) a program for implementing the respective processing units (such as the current terrain information acquisition unit, the original terrain information acquisition unit, and the overhead-view imaging processing unit), and loads the program into an internal memory, to thereby implement the respective processing units. The information presentation device may be disposed at the operator's seat of the work machine 1, or may be disposed in a remote area (for example, a management office) separate from the work machine 1 and the imaging device 33.

The current terrain is captured by the imaging device 33 or the like, such as a camera installed at the construction site 31. Upon receiving images of the current terrain, the current terrain information acquisition unit 25 integrates and converts the images into an overhead-view image (Overhead-view image 1), and transmits the image to the overhead-view image synthesis unit 28.

The original terrain information acquisition unit 26 acquires an overhead-view image (overhead-view image of the original terrain of the construction site 31) captured by the drone, satellite, or the like, or an image drawn based on a design drawing (overhead-view image of the original terrain: Overhead-view image 2).

The overhead-view image synthesis unit 28 superimposes Overhead-view image 1, created based on the current terrain information, over Overhead-view image 2 of the construction site 31 acquired by the original terrain information acquisition unit 26, to synthesize an image. The overhead-view image synthesis unit 28 transmits the synthesized overhead-view image (Overhead-view image 3) to the display unit 29.

The display unit 29 is for Overhead-view image 3 synthesized by the overhead-view image synthesis unit 28, and includes a display device, such as a monitor, and/or a display terminal, such as a smartphone, carried by the operator of the hydraulic shovel (work machine) 1, a site worker, a construction manager, or a site supervisor.

<Example of Overhead-View Image 2>

Figure 4:
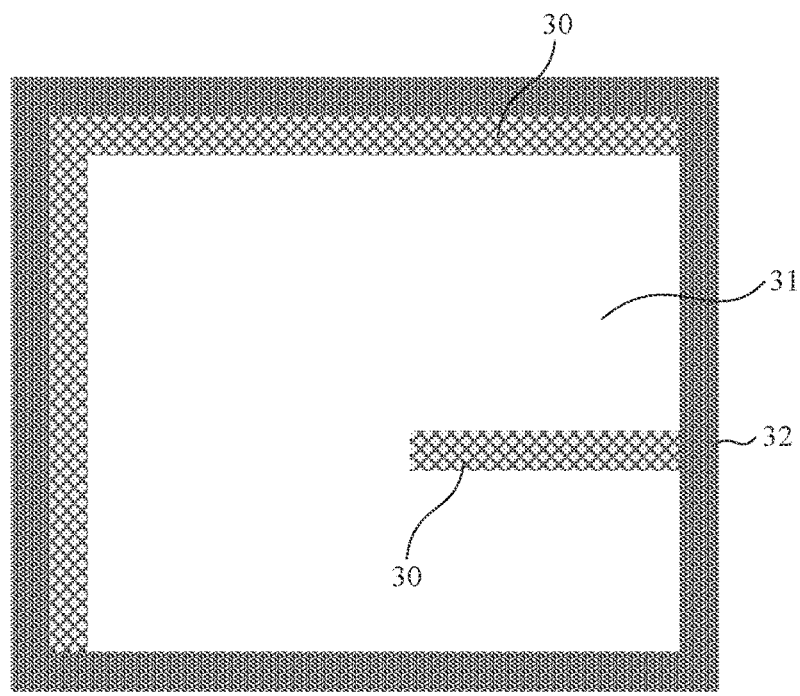
FIG. 4 illustrates an example of Overhead-view image 2 acquired by an original terrain information acquisition unit 26.

FIG. 4 shows an example of Overhead-view image 2 acquired by the original terrain information acquisition unit 26. A site worker uses an apparatus, such as a drone capable of capturing an overhead-view image, to capture an image prior to construction. The original terrain image may be drawn based on a design drawing. In the original terrain image, the construction site 31 is partitioned into the inside 31 of the construction site, the outside 32 of the construction site, and a fixed obstacle 30. The partitioning is implemented prior to the start of construction, and is not necessarily required to have a high update frequency. The method for partitioning, which is required to be set at the initiative of the site worker or the construction manager, may use a learning function such as deep learning, and use an algorithm for automatically recognizing the boundaries of the fixed obstacle 30 and the construction site 31. Further, when the overhead-view image is captured/drawn, the coordinates of a reference point of the construction site 31 are determined in advance.

<Example of Overhead-View Image 1>

Figure 5:
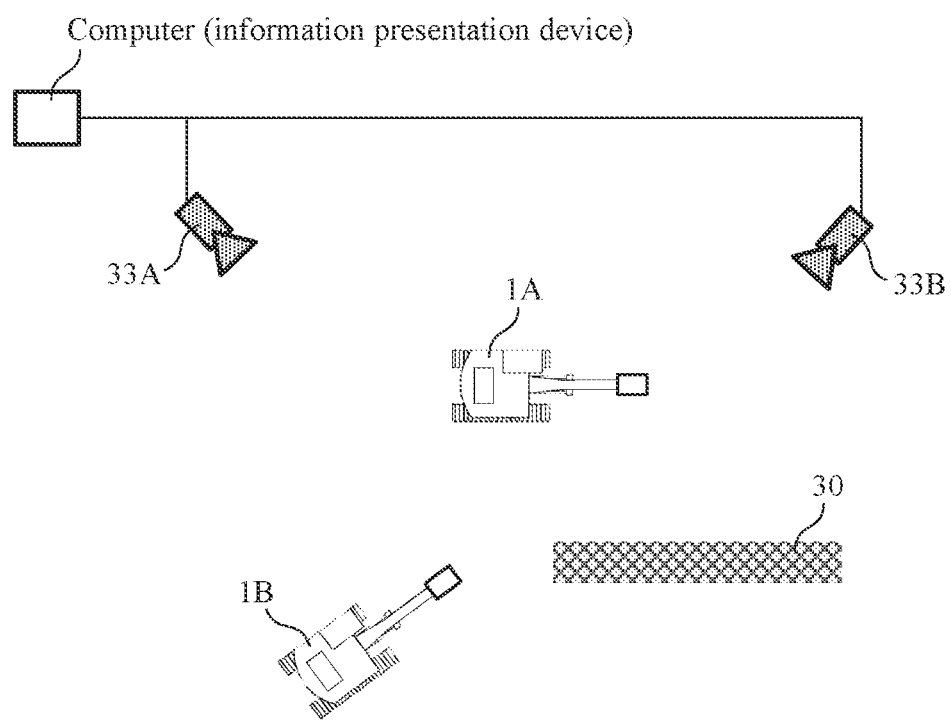
FIG. 5 illustrates an example of Overhead-view image 1 acquired by a current terrain information acquisition unit 25.

FIG. 5 illustrates an example of Overhead-view image 1 acquired by the current terrain information acquisition unit 25. At least one imaging device 33, such as a camera, is disposed near the construction site 31 or inside the construction site 31, at a position and height allowing for the capturing of the inside 31 of the construction site 31. Then, the construction site 31 is captured by the imaging device 33. The position (coordinates) and height at which the imaging device 33 is disposed, and the angle of view and the line-of-sight direction of the imaging device 33 are registered in advance by the worker manually. Alternatively, data associating an apparatus capable of performing own position estimation, such as a GNSS, with the imaging device 33 is automatically registered in the current terrain information acquisition unit 25.

Further, the current terrain information acquisition unit 25 (the aforementioned computer) stores (in the aforementioned memory) a modification parameter of the image captured by the imaging device 33, in advance for each imaging device 33. The modification parameter of the image is data that can be identified (determined) based on the installation position and the line-of-sight direction of the imaging device 33. It is noted that the method for generating Overhead-view image 1 is not limited to the above. For example, triangulation may be performed with respect to a plurality of images acquired by the current terrain information acquisition unit 25, to create a three-dimensional image of the construction site 31, and then an overall overhead-view image (Overhead-view image 1) may be created based on the obtained three-dimensional image.

<Example of Overhead-View Image 3>

Figure 6:
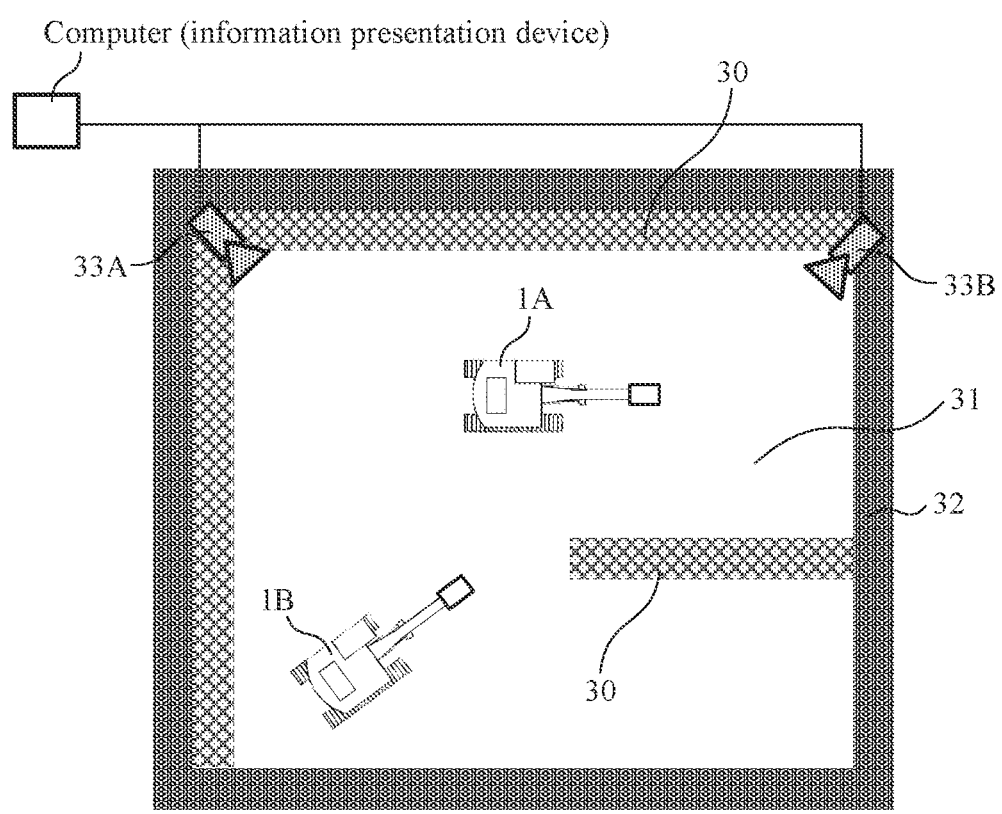
FIG. 6 illustrates an example of Overhead-view image 3 generated by an overhead-view image synthesis unit 28 superimposing current terrain information (Overhead-view image 1) over original terrain information (Overhead-view image 2).

FIG. 6 illustrates an example of Overhead-view image 3 generated by the overhead-view image synthesis unit 28 superimposing the current terrain information (Overhead-view image 1) over the original terrain information (Overhead-view image 2).

The Overhead-view image 1 of the current terrain created by the current terrain information acquisition unit 25 is compared with the reference point of the original terrain information (Overhead-view image 2) based on the position information of each imaging device 33, and the synthesized positions are adjusted to generate Overhead-view image 3.

<Details of Overhead-View Image Generation Process>

Figure 7:
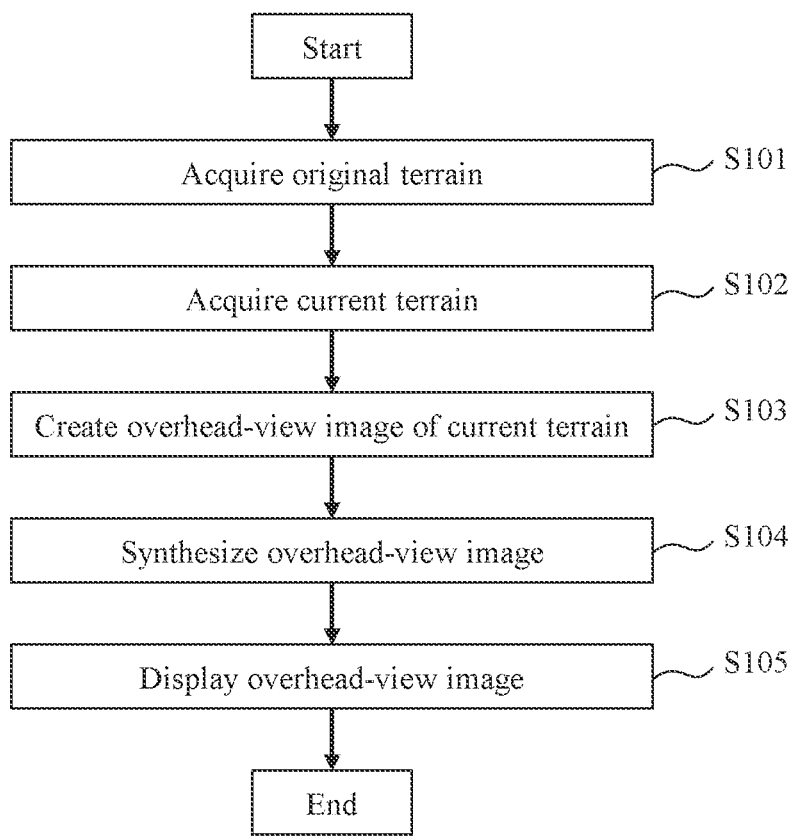
FIG. 7 is a flowchart for describing in detail an overhead-view image generation process of generating Overhead-view image 3 according to the present embodiment.

FIG. 7 is a flowchart for describing in detail an overhead-view image generation process of generating Overhead-view image 3 according to the present embodiment. In the following steps, the actor is the respective processing units (the current terrain information acquisition unit 25, the original terrain information acquisition unit 26, and the overhead-view image synthesis unit 28). However, because programs corresponding to the respective units are read from memory and implemented by the processor of the computer (information presentation device), as described above, the actor may be the processor.

(i) Step 101

The original terrain information acquisition unit 26 acquires the overhead-view image captured by the drone or satellite, or the image drawn based on the design drawing (Overhead-view image 2), and transmits Overhead-view image 2 to the overhead-view image synthesis unit 28. The Overhead-view image 2 may be, for example, an image stored in a database or a storage device in advance, or an image that has been newly captured or obtained and input into the information presentation device by the operator or the construction manager.

(ii) Step 102

The current terrain information acquisition unit 25 receives the current terrain image captured by at least one imaging device 33 and transmitted therefrom.

(iii) Step 103

The current terrain information acquisition unit 25 integrates the images (images from a plurality of imaging devices 33) received in step 102 in alignment with a predetermined reference point defined in advance (for example, any desired pixel or region of at least one of the images), thereby converting the images into an overhead-view image (Overhead-view image 1). Then, the current terrain information acquisition unit 25 transmits the generated Overhead-view image 1 to the overhead-view image synthesis unit 28.

(iv) Step 104

The overhead-view image synthesis unit 28 synthesizes or converts Overhead-view image 2 received from the original terrain information acquisition unit 26 and Overhead-view image 1 received from the current terrain information acquisition unit 25 to generate a synthesized overhead-view image (Overhead-view image 3), and transmits the image to the display unit 29.

(v) Step 105

The display unit 29 displays Overhead-view image 3 on a display screen. In this way, the operator, the construction manager, the worker of the hydraulic shovel (work machine) 1, a nearby worker, and/or the site supervisor can understand the situation of the construction site as viewed from above.

Thus, by superimposing the overhead-view image of the current terrain over the overhead-view image of the original terrain, the overhead-view image of the current terrain can be complemented when the information of the overhead-view image is lacking.

(2) Second Embodiment

If the number of the imaging devices 33 available at the construction site 31 is limited, it is likely that a blind area 40 is present in the work site. In this case, unless the presence of the blind area 40 is presented to the operator of the hydraulic shovel (work machine) 1, it may be difficult to perform an operation (work) taking into consideration the likelihood that an obstacle (such as another work machine) may appear out of the blind area 40 of the fixed obstacle 30.

In view of the above, the second embodiment provides an information presentation device and an information presentation method whereby, when a blind area (blind area 40 as will be described below) is present at the construction site 31, the blind area 40 can be presented to the operator of the hydraulic shovel (work machine) 1.

With reference to FIG. 8 to FIG. 11, the information presentation device according to the second embodiment of the present disclosure is described. In FIG. 8 to FIG. 11, signs similar to those of FIG. 1 to FIG. 7 designate similar components or processing units, and therefore redundant description is omitted.

In the first embodiment, the overhead-view image of the current terrain is superimposed over the overhead-view image of the original terrain. In contrast, in the second embodiment, the information presentation device further comprises: a blind area computation unit 39 that computes the blind area 40 of the overhead-view image generated by the current terrain information acquisition unit 25; and a determination unit 38 that, in accordance with the distance to the computed blind area 40 or the area of the blind area 40, determines that the information of the overhead-view image of the current terrain is lacking.

<Functional Configuration Example of Information Presentation Device>

Figure 8:
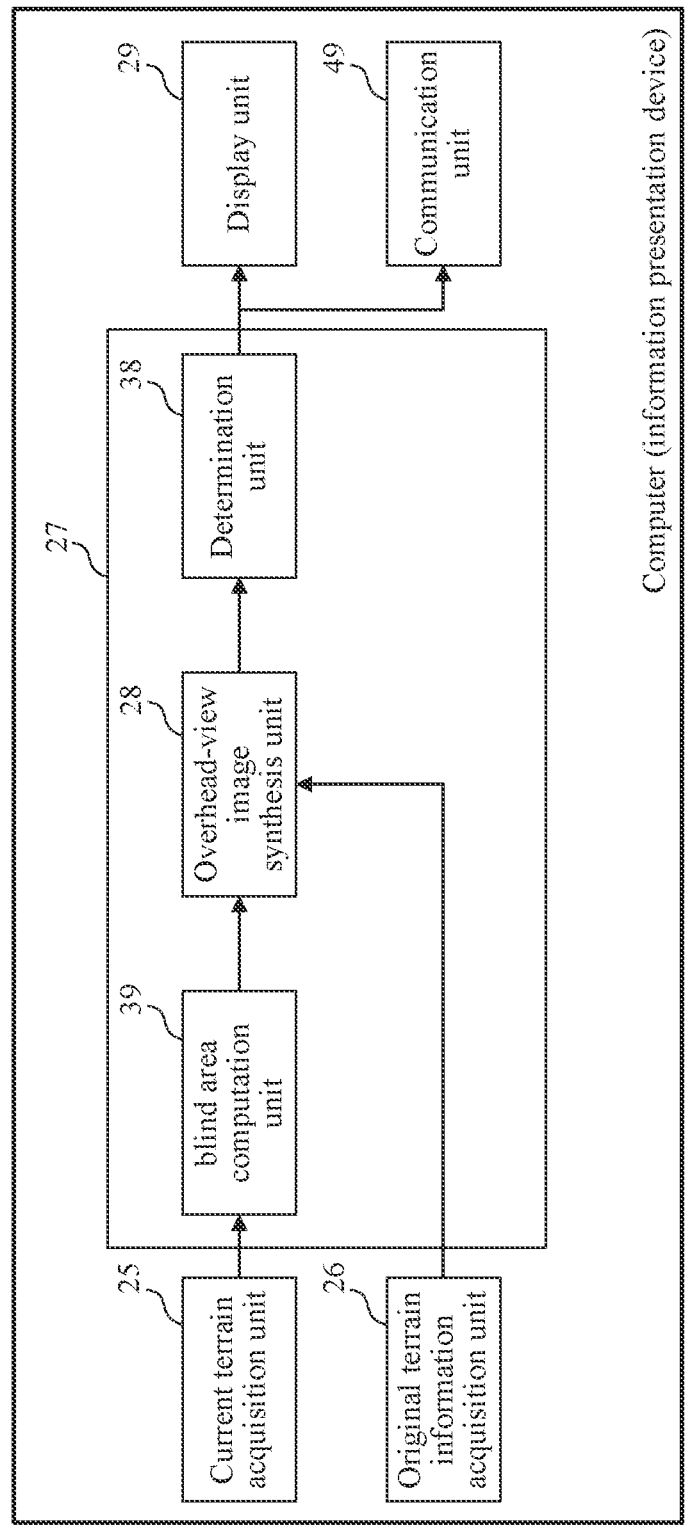
FIG. 8 is a block diagram illustrating a functional configuration example of an information presentation device according to a second embodiment.

FIG. 8 is a block diagram illustrating a functional configuration example of the information presentation device according to the second embodiment. For example, in the information presentation device, the blind area computation unit 39, based on the overhead-view image of the current terrain (Overhead-view image 1) created by the current terrain information acquisition unit 25, divides Overhead-view image 1 into a grid, and computes the area of cells located outside the capture range of the imaging device 33. Alternatively, it is also possible to estimate the range of the blind area 40 in detail from the position, height, line of sight direction, and angle of view of the imaging device 33.

The determination unit 38 determines whether the information of Overhead-view image 1 is lacking in accordance with the result of computation by the blind area computation unit 39. Specifically, if the area of the blind area 40 at the construction site 31 exceeds a certain threshold value for the entire area of the construction site 31, the determination unit 38 determines that the information (information necessary for safe operation of the work machine 1 (vehicle body)) is lacking. In this way, when the work machine (hydraulic shovel) 1 works near the blind area, for example, in view of the likelihood that an obstacle may appear unexpectedly out of the blind area 40 of the fixed obstacle 30 and may contact the front work unit 23 or a counter weight 11, a warning can be issued in advance when a mostly rotating or travelling operation is performed. The threshold value for the area of the blind area 40 may be set by the construction manager as desired. When the position (coordinates) of the work machine 1 can be estimated by means of, e.g., a GNSS or the imaging device 33, it may be determined that the necessary information (information necessary for safe operation of the work machine 1 (vehicle body)) is lacking if the distance from the work machine 1 to the blind area 40 is less than or equal to a threshold value, such as within the movable range 24 of the work machine 1, and if the area of the relevant blind area 40 is greater than or equal to a certain area.

The display unit 29 displays Overhead-view image 4 (overhead-view image incorporating the blind area) generated by performing, for example, a display process in which the blind area 40 portion of the overhead-view image (Overhead-view image 3) synthesizing Overhead-view image 1 and Overhead-view image 2 is filled. In this way, it becomes possible to visualize the blind area 40 of the construction site 31 to the operator, the construction manager, a nearby worker, and/or the site supervisor. In addition, if it is determined by the determination unit 38 that the necessary information is lacking, a warning such as "information lacking" is displayed on the display unit 29. The display unit 29 may implement the warning audibly, in addition to via a display device such as a monitor, or a display terminal such as a smartphone.

<Concerning Computation of Blind Area 40>

Figure 9A:
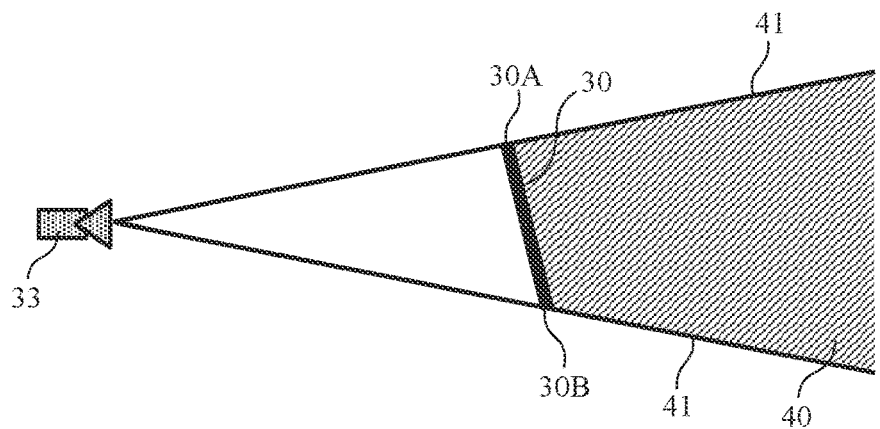
FIG. 9A is a FIG. 1) for describing a method for computing a blind area 40 (the presence or absence of a blind area, position of a blind area, and extent (size) of a blind area).
Figure 9B:
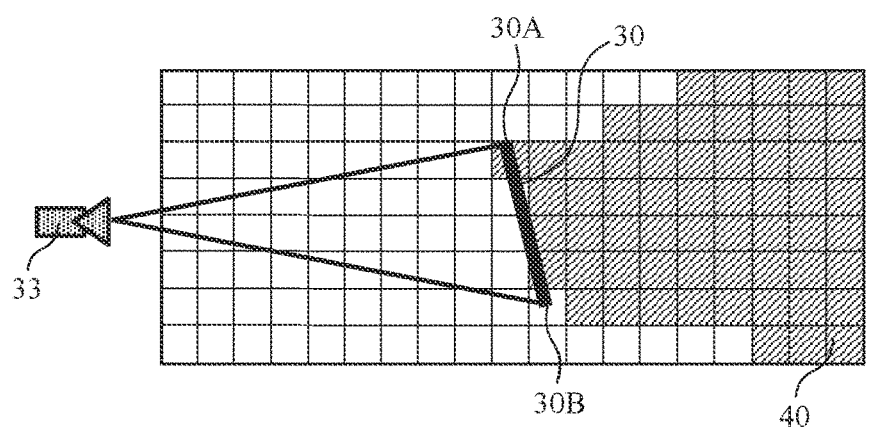
FIG. 9B is a FIG. 2) for describing a method for computing the blind area 40 (presence or absence of a blind area, position of a blind area, and extent (size) of a blind area).
Figure 9C:
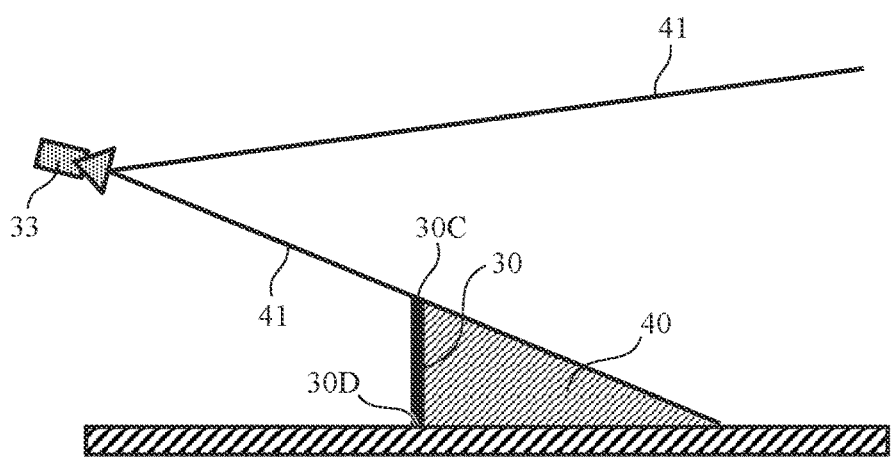
FIG. 9C is a FIG. 3) for describing a method for computing the blind area 40 (presence or absence of a blind area, position of a blind area, and extent (size) of a blind area).

With reference to FIG. 9A to FIG. 9C, the method for computing the blind area 40 (presence or absence of the blind area, position of the blind area, and extent (size) of the blind area) is described in detail. First, when the fixed obstacle 30 is captured by the imaging device 33 such as a camera, the lines connecting the ends 30A and 30B of the fixed obstacle 30 and the center point of the imaging device 33 provide blind area lines 41, and the inside of the blind area lines 41 provides the blind area 40. Then, as illustrated in FIG. 9B, the blind area 40 is equally divided into a grid or pixel units (thereby enabling identification of the coordinates constituting the blind area), whereby the area of the blind area 40 can be represented by the area for the number of the squares. Accordingly, if it is desired to determine the area of the blind area 40 more precisely, the grid demarcations would have to be finer. When the area inside the blind area lines 41 (portion hidden as the blind area) per square (grid) is greater than or equal to a threshold value, the grid is determined to be a square constituting the blind area 40. The threshold value may be set as desired.

When the imaging device 33 such as a camera is installed at a position higher than the height of the fixed obstacle 30, a line connecting the top 30C of the fixed obstacle and the center point of the imaging device 33 provides a blind area line 41, whereby the blind area in the depth portion can be reduced.

Thus, by three-dimensionally identifying the blind area 40, it becomes possible to determine accurately whether the work machine 1 can be safely operated.

<Example of Overhead-View Image 4>

Figure 10:
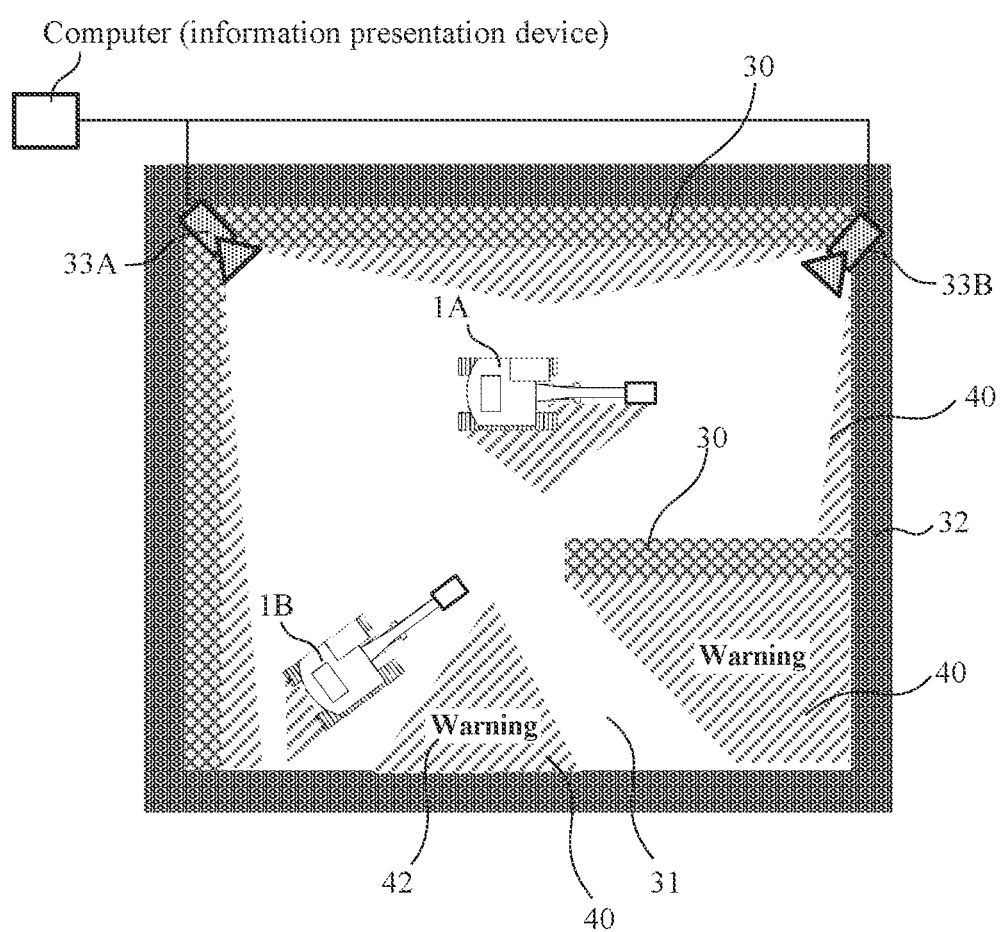
FIG. 10 illustrates an example of Overhead-view image 4 (an overhead-view image generated by incorporating the blind area into Overhead-view image 3) according to the second embodiment.

FIG. 10 illustrates an example of Overhead-view image 4 (overhead-view image generated by incorporating the blind area into Overhead-view image 3) according to the second embodiment.

As illustrated in FIG. 10, the display unit 29 displays, on the display screen of the information presentation device, Overhead-view image 4 generated by superimposing the blind area 40 of the current terrain information acquisition unit 25 over Overhead-view image 3. Further, the display unit 29, if the area of the blind area 40 is large, displays "warning" on the display screen, thus warning about the likelihood that another obstacle (not shown) may appear out of the blind area 40.

<Details of Overhead-View Image Generation Process>

Figure 11:
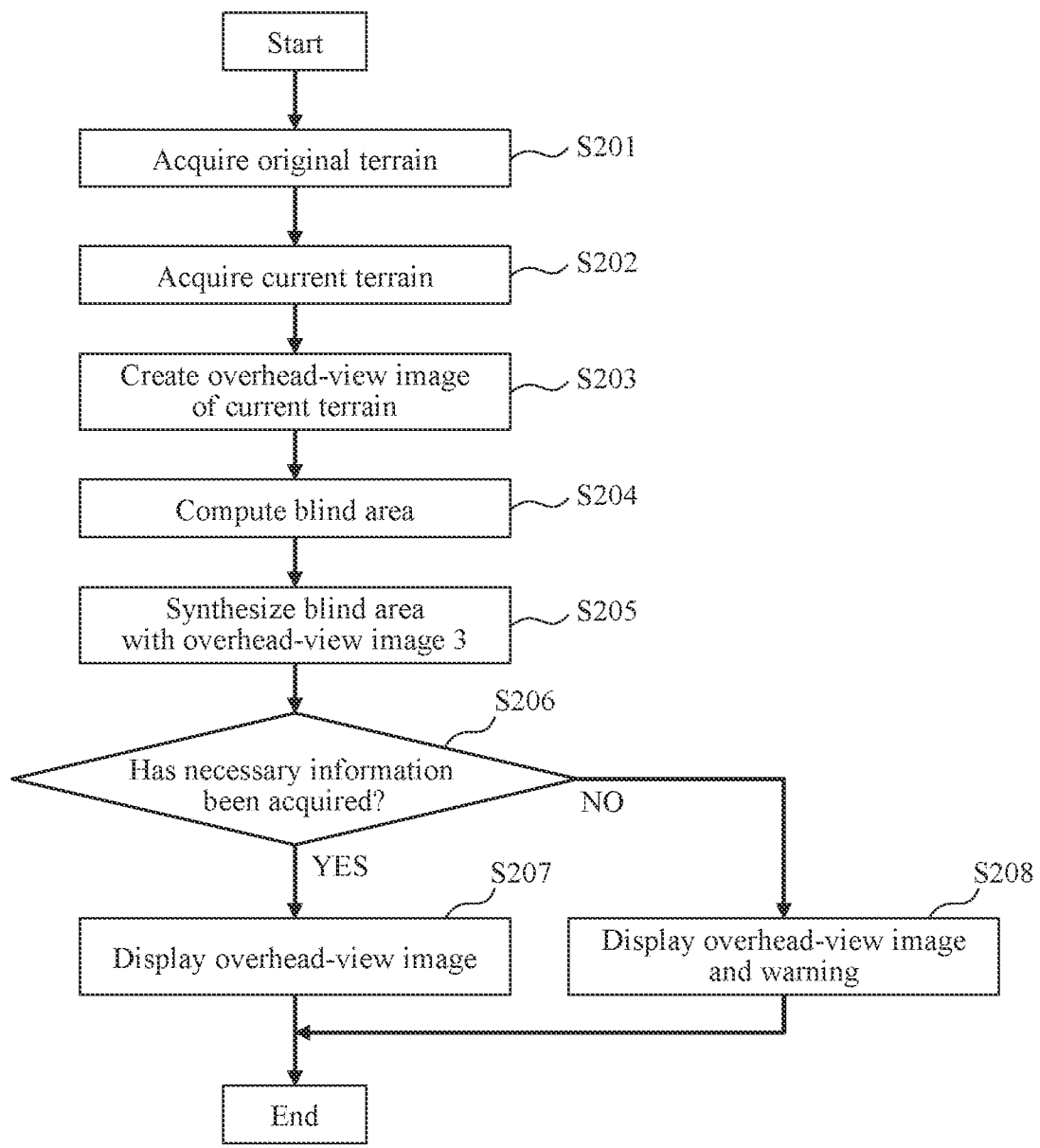
FIG. 11 is a flowchart for describing in detail a process of generating Overhead-view image 4 according to the second embodiment.

FIG. 11 is a flowchart for describing in detail the process of generating Overhead-view image 4 according to the second embodiment. In the steps described below, the actor is the respective processing units (the current terrain information acquisition unit 25, the original terrain information acquisition unit 26, the blind area computation unit 39, the overhead-view image synthesis unit 28, and the determination unit 38). However, because programs corresponding to the respective units are read from memory and implemented by the processor of the computer (information presentation device), as described above, the actor may be the processor.

(i) Step 201

The original terrain information acquisition unit 26 acquires the overhead-view image captured by the drone or satellite, or the image drawn based on the design drawing (Overhead-view image 2), and transmits Overhead-view image 2 to the overhead-view image synthesis unit 28. Overhead-view image 2 may be, for example, an image stored in a database or a storage device in advance, or an image newly captured or obtained by the operator or the construction manager and input to the information presentation device.

(ii) Step 202

The current terrain information acquisition unit 25 receives the current terrain image captured by at least one imaging device 33 and transmitted therefrom.

(iii) Step 203

The current terrain information acquisition unit 25 integrates the images (a plurality of images from the imaging devices 33) received in step 202 in alignment with a predetermined reference point defined in advance (for example, any desired pixel or region of one of the images), thereby converting the images into an overhead-view image (Overhead-view image 1). Then, the current terrain information acquisition unit 25 transmits the generated Overhead-view image 1 to the blind area computation unit 39.

(iv) Step 204

The blind area computation unit 39 computes the presence or absence of the blind area 40 (see FIG. 9A to FIG. 9C), the area of the blind area 40 (see FIG. 9A to C), and the distance to the blind area 40 (distance: for example, the shortest distance from the movable range 24A or the movable range 24 of the work machines 1A and 1B to the blind area 40). Then, the blind area computation unit 39 transmits the information about the blind area 40 (presence/absence, area, and distance) to the overhead-view image synthesis unit 28, together with Overhead-view image 1.

(v) Step 205

The overhead-view image synthesis unit 28 generates the synthesized overhead-view image (Overhead-view image 3) by synthesizing or converting Overhead-view image 2 received from the original terrain information acquisition unit 26 and Overhead-view image 1 that is received from the blind area computation unit 39 (or that may be received directly from the current terrain information acquisition unit 25), and further generates Overhead-view image 4 (overhead-view image incorporating the blind area) by synthesizing the blind area 40 received from the blind area computation unit 39 with Overhead-view image 3. Then, the overhead-view image synthesis unit 28 transmits Overhead-view image 4 and the information about the blind area 40 (for example, at least the area of the blind area among the presence or absence, area, and distance of the blind area) to the determination unit 38.

(vi) Step 206

The determination unit 38, based on the information received from the overhead-view image synthesis unit 28, determines whether the necessary information (information necessary for safe operation of the work machine 1 (vehicle body)) has been acquired. For example, it is determined that the necessary information has been acquired if the distance from the work machine 1 to the blind area 40 (the shortest distance from the movable range 24A or the movable range 24 of the work machines 1A and 1B to the blind area 40) is greater than a predetermined threshold value (distance threshold value), and the area of the blind area 40 is less than or equal to a predetermined threshold value. If it is determined that the necessary information has been acquired (Yes in step 206), the process proceeds to step 207. If it is determined that the necessary information has not been acquired (No in step 206), the proceeds to process step 208.

(vii) Step 207

The display unit 29 displays Overhead-view image 4 on the display screen. In this way, the construction manager, the operator of the hydraulic shovel (work machine) 1, a nearby worker, and/or the site supervisor can understand the situation of the construction site as viewed from above, and can maneuver the work machine 1 at the construction site 31 safely.

(viii) Step 208

The display unit 29 displays Overhead-view image 4 on the display screen with "warning" (the word warning, or a mark or the like indicating danger) superimposed thereover. In this way, the construction manager, the operator of the hydraulic shovel (work machine) 1, a nearby worker, and/or the site supervisor can understand the situation of the construction site as viewed from above, and can understand the risk of maneuvering the work machine 1 at the construction site 31.

Thus, by computing the area of the blind area 40 at the construction site 31 and warning the operator, a nearby worker, and the site supervisor about a lack of necessary information, it becomes possible to implement an operation taking into consideration the likelihood that an obstacle may appear out of the blind area 40 of the fixed obstacle 30. Further, by displaying the blind area 40 on the display unit 29, it becomes possible to prompt a change in the arrangement of the current terrain information acquisition unit 25.

(3) Third Embodiment

With reference to FIG. 12 to FIG. 15, the information presentation device according to a third embodiment of the present disclosure is described. In FIG. 12 to FIG. 15, signs similar to those of FIG. 1 to FIG. 11 designate similar components or processing units, and therefore redundant description is omitted.

In the second embodiment, the imaging device 33 is disposed around the construction site 31; it is determined whether necessary information is lacking from the area acquired of the blind area 40 in the current terrain; and then the operator, a nearby worker, and the site supervisor are warned. In contrast, the third embodiment comprises a function whereby the data of an in-vehicle overhead-view image 48, which is created based on the images captured by the in-vehicle imaging device 33, is synthesized with (superimposed over) the current terrain information (Overhead-view image 1) to thereby reduce the area of the blind area 40.

<Functional Configuration Example of Information Presentation Device>

Figure 12:
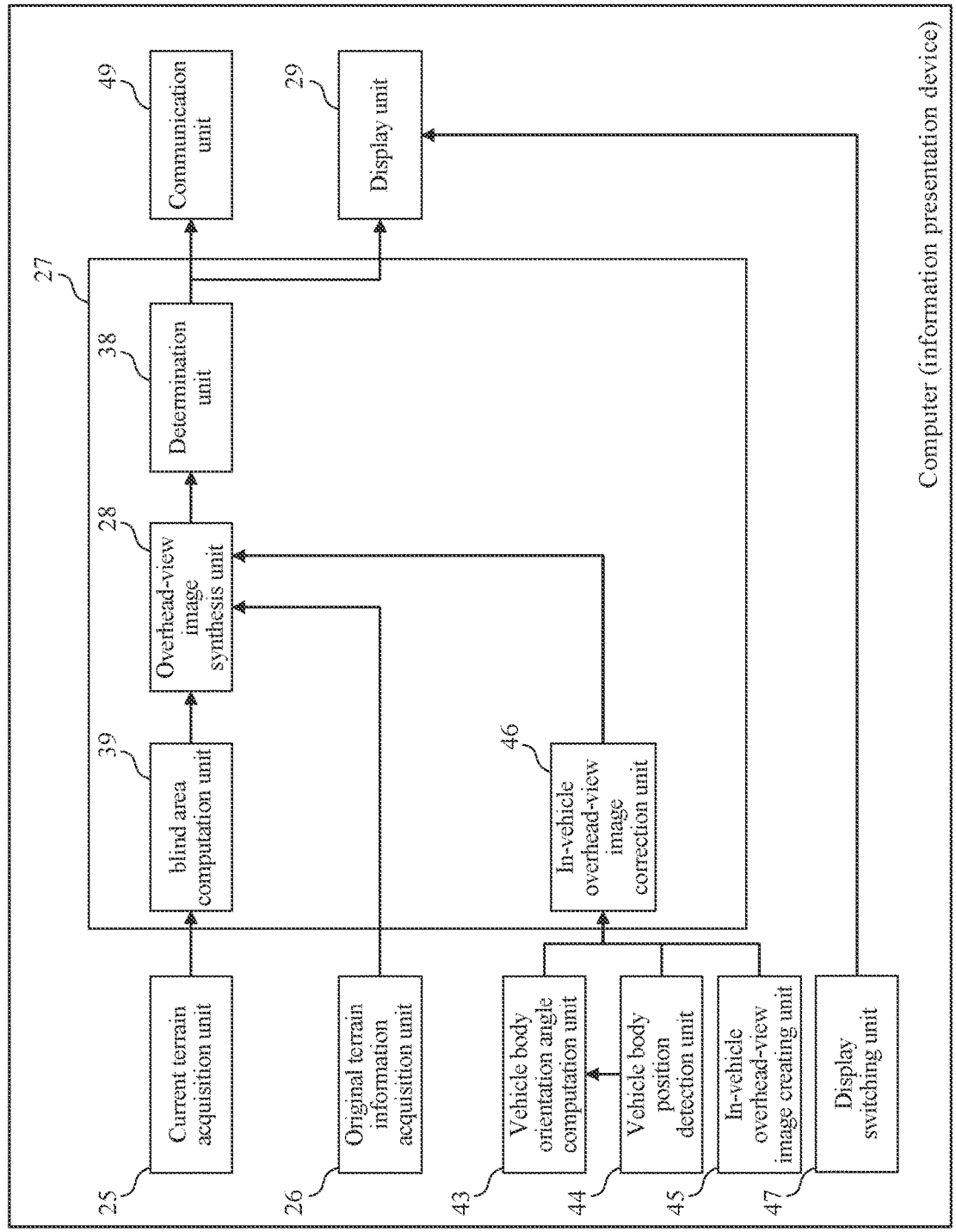
FIG. 12 is a block diagram illustrating a functional configuration example of an information presentation device according to a third embodiment.

FIG. 12 is a block diagram illustrating a functional configuration example of the information presentation device according to the third embodiment. As illustrated in FIG. 12, the information presentation device comprises, in addition to the configuration elements of FIG. 8, a vehicle body orientation angle computation unit 43, a vehicle body position detection unit 44, an in-vehicle overhead-view image creating unit 45, and a display switching unit 47.

The vehicle body orientation angle computation unit 43, based on the position information from the vehicle body position detection unit 44, acquires the orientation of the work machine 1 according to a construction site standard, and transmits the information about the orientation to an in-vehicle overhead-view image correction unit 46. The vehicle body position detection unit 44 identifies the position of the work machine 1 according to the construction site standard or a global coordinate standard, and transmits the information about the position to the in-vehicle overhead-view image correction unit 46. The in-vehicle overhead-view image creating unit 45 transmits an overhead-view image (hereafter referred to as an in-vehicle overhead-view image 48) created based on the in-vehicle imaging device 33 to the in-vehicle overhead-view image correction unit 46.

<Example of In-Vehicle Overhead-View Image>

Figure 13:
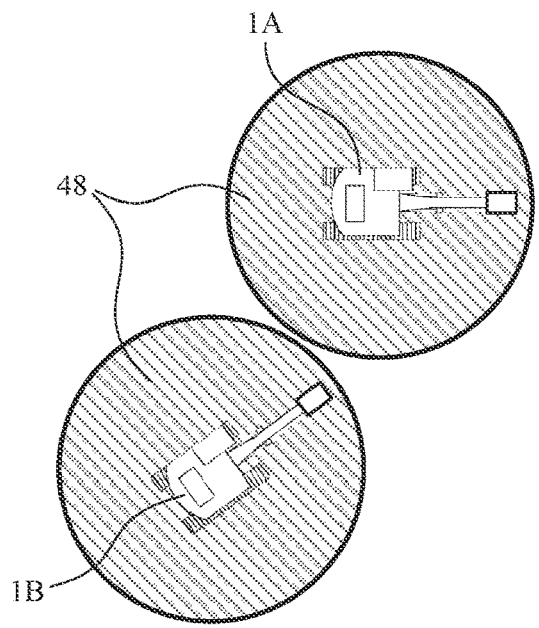
FIG. 13 illustrates an example of an in-vehicle overhead-view image 48.

FIG. 13 illustrates an example of the in-vehicle overhead-view image 48. Here, the position and orientation of the in-vehicle overhead-view image 48 for synthesis with the overhead-view image of the current terrain vary depending on the position and orientation of the work machine 20. Accordingly, first, the position for synthesizing the in-vehicle overhead-view image 48 is identified from the positional relationship between the position information of the work machines 1A and 1B and the reference point of the construction site 31.

Next, image data is rotated by the in-vehicle overhead-view image correction unit 46 by the orientation angle of the work machines, based on the orientation information of the work machines 1A and 1B according to the construction site standard or the global coordinate standard. Further, the rotated image data is projected onto the overhead-view image in accordance with the acquired position of the work machines 1A and 1B and synthesized, whereby it becomes possible to display the in-vehicle overhead-view image 48 over the overhead-view image of the construction site.

<Example of Synthesized Overhead-View Image>

Figure 14:
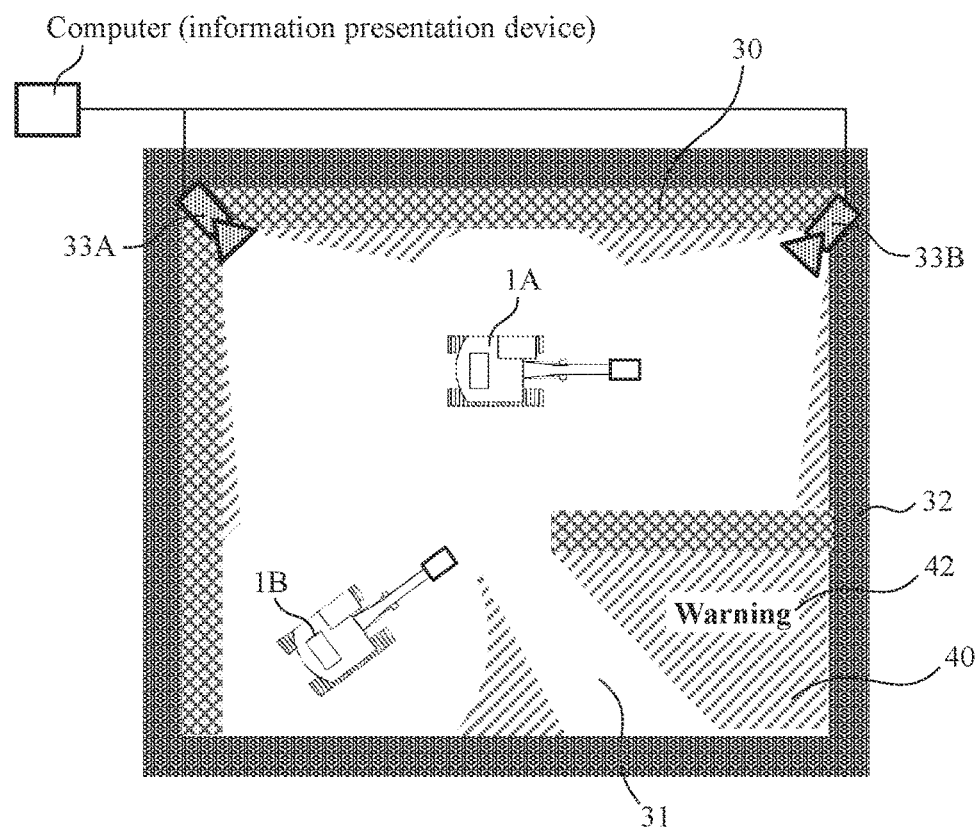
FIG. 14 illustrates an example of a synthesized Overhead-view image 5 according to the third embodiment.

FIG. 14 illustrates an example of a synthesized Overhead-view image 5 according to the third embodiment. Overhead-view image 5 illustrated in FIG. 14 is an image obtained by reflecting the in-vehicle overhead-view image 48 in Overhead-view image 1, and further synthesizing Overhead-view image 2 therewith; that is, an image obtained by removing, from the blind area 40 of Overhead-view image 4 illustrated in FIG. 10, the regions covered by the in-vehicle overhead-view image 48.

By superimposing the blind area 40 and the in-vehicle overhead-view image 48 over the overhead-view image of the current terrain 1 acquired by the current terrain information acquisition unit 25, it becomes possible to make up for the blind area 40 of Overhead-view image 1 acquired by the current terrain information acquisition unit 25. Then, the overhead-view image synthesis unit 28 further superimposes Overhead-view image 2 from the original terrain information acquisition unit 26 over the overhead-view image from the blind area computation unit 39 (the image obtained by superimposing the blind area 40 and the in-vehicle overhead-view image 48 over Overhead-view image 1), whereby Overhead-view image 5 can be generated.

Thus, by using the in-vehicle overhead-view image 48, it becomes possible to reduce the area of the blind area 40, and to implement an operation taking into consideration the likelihood that an obstacle may appear out of the blind area 40 of the fixed obstacle 30.

The display switching unit 47 can switch the in-vehicle overhead-view image 48 and Overhead-view image 5 (overhead-surroundings-view image) by means of a button or a touchscreen of the monitor.

<Details of Overhead-View Image Generation Process>

Figure 15:
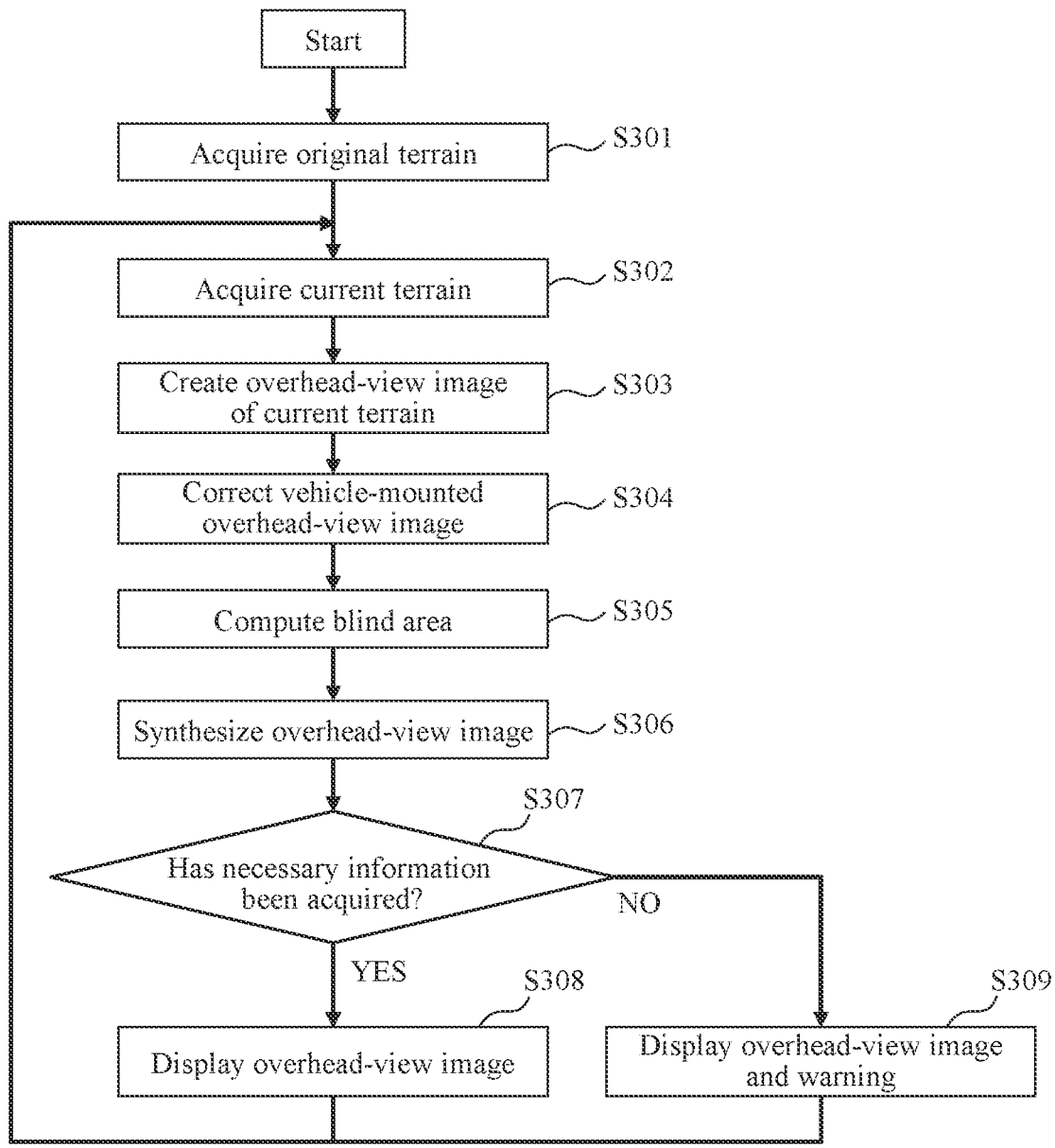
FIG. 15 is a flowchart for describing in detail a process of generating Overhead-view image 5 according to the third embodiment.

FIG. 15 is a flowchart for describing in detail the process of generating Overhead-view image 5 according to the third embodiment. In the steps described below, the actor is the respective processing units (the current terrain information acquisition unit 25, the original terrain information acquisition unit 26, the blind area computation unit 39, the overhead-view image synthesis unit 28, the determination unit 38, the vehicle body orientation angle computation unit, the vehicle body position detection unit 44, the in-vehicle overhead-view image creating unit 45, and the display switching unit 47). However, because programs corresponding to the respective units are read from memory and implemented by the processor of the computer (information presentation device), as described above, the actor may be the processor.

(i) Step 301

The original terrain information acquisition unit 26 acquires the overhead-view image captured by the drone or satellite, or the image drawn based on the design drawing (Overhead-view image 2), and transmits Overhead-view image 2 to the overhead-view image synthesis unit 28. The Overhead-view image 2 may be, for example, an image stored in a database or a storage device in advance, or an image newly captured or obtained by the operator or the construction manager and input to the information presentation device.

(ii) Step 302

The current terrain information acquisition unit 25 receives the current terrain image captured by at least one imaging device 33 and transmitted therefrom.

(iii) Step 303

The current terrain information acquisition unit 25 integrates the images received in step 302 (a plurality of images from the imaging devices 33) in alignment with a predetermined reference point defined in advance (for example, any desired pixel or region of one of the images) and converts them into an overhead-view image (Overhead-view image 1). The current terrain information acquisition unit 25 then transmits the generated Overhead-view image 1 to the blind area computation unit 39.

(iv) Step 304

The in-vehicle overhead-view image correction unit 46 receives the in-vehicle overhead-view image of the work machine 1 from the in-vehicle overhead-view image creating unit 45, the information about the orientation angle of the work machine 1 from the vehicle body orientation angle computation unit 43, and the information about the position of the work machine 1 from the information from the vehicle body position detection unit 44. Then, the in-vehicle overhead-view image correction unit 46 corrects the in-vehicle overhead-view image of the work machine 1 based on the information about the orientation angle and position of the work machine 1, and transmits the corrected in-vehicle overhead-view image to the overhead-view image synthesis unit 28.

(v) Step 305

The blind area computation unit 39 computes the presence or absence of the blind area 40 (see FIG. 9A to FIG. 9C), the area of the blind area 40 (see FIG. 9A to FIG. 9C), and the distance to the blind area 40 (distance: for example, the shortest distance from the movable range 24A or the movable range 24 of the work machines 1A and 1B to the blind area 40). Then, the blind area computation unit 39 transmits the information about the blind area 40 (presence/absence, area, and distance) to the overhead-view image synthesis unit 28, together with Overhead-view image 1.

(vi) Step 306

The overhead-view image synthesis unit 28 generates Overhead-view image 5 (see FIG. 14) reflecting the blind area 40 and the in-vehicle overhead-view image, based on (by synthesizing) Overhead-view image 2 received from the original terrain information acquisition unit 26, Overhead-view image 1 and the information about the blind area 40 received from the blind area computation unit 39, and the in-vehicle overhead-view image (corrected in-vehicle overhead-view image) 48 received from the in-vehicle overhead-view image correction unit 46. Then, the overhead-view image synthesis unit 28 transmits Overhead-view image 5 to the determination unit 38.

(vii) Step 307

The determination unit 38, based on the information received from the overhead-view image synthesis unit 28, determines whether the necessary information (information necessary for safe operation of the work machine 1 (vehicle body)) has been acquired. For example, it is determined that the necessary information has been acquired if the distance from the work machine 1 to the blind area 40 (the shortest distance from the movable range 24A or the movable range 24 of the work machines 1A and 1B to the blind area 40) is greater than a predetermined threshold value (distance threshold value), and the area of the blind area 40 is less than or equal to a predetermined threshold value. If it is determined that the necessary information has been acquired (Yes in step 307), the process proceeds to step 308. If it is determined that the necessary information has not been acquired (No in step 307), the process proceeds to step 309.

(viii) Step 308

The display unit 29 displays Overhead-view image 5 on the display screen. In this way, the construction manager, the operator of the hydraulic shovel (work machine) 1, a nearby worker, and/or the site supervisor can understand the situation of the construction site as viewed from above, and can safely maneuver the work machine 1 at the construction site 31.

(ix) Step 309

The display unit 29 displays Overhead-view image 5 on the display screen with "warning" (the word warning, or a mark or the like indicating danger) superimposed thereover. In this way, the construction manager, the operator of the hydraulic shovel (work machine) 1, a nearby worker, and/or the site supervisor, for example, can understand the situation of the construction site as viewed from above, and can understand the risk of maneuvering the work machine 1 at the construction site 31.

Thus, by computing the area of the blind area 40 at the construction site 31, and warning the operator, the construction manager, a nearby worker, and/or the site supervisor, for example, about a lack of necessary information, it becomes possible to implement an operation taking into consideration the likelihood that an obstacle may appear out of the blind area 40 of the fixed obstacle 30. Further, by displaying the blind area 40 on the display unit 29, it becomes possible to prompt a change in the arrangement of the current terrain information acquisition unit 25.

Conclusion (4)
(i) According to the first embodiment, the information presentation device: generates a first synthesized overhead-view image (Overhead-view image 3) by superimposing the first overhead-view image (Overhead-view image 1) representing the current terrain of the construction site 31 as viewed from above, and the second overhead-view image (Overhead-view image 2), which is acquired by a method (for example, capturing by a drone or a satellite) other than capturing by the imaging device 33 installed at the construction site, and which represents the original terrain of the construction site as viewed from above; and outputs (displays on the display screen of the display unit 29) the first synthesized overhead-view image. Thus, because the overhead-view image of the current construction site as a whole is generated using Overhead-view image 2 complementarily, which is originally present in the current image acquired by the imaging device, it is possible to provide a helpful overhead-view image of the construction site to the worker, even when the number of the imaging devices 33 installed at the construction site is small.
(ii) According to the second embodiment, the information presentation device, using the first overhead-view image (Overhead-view image 1) acquired by the imaging device 33, identifies the blind area 40 at the construction site, generates the second synthesized overhead-view image (Overhead-view image 4) by reflecting the image of the blind area 40 in the first synthesized overhead-view image (Overhead-view image 3), and then outputs the second synthesized overhead-view image. In this way, the likelihood of another work machine or the like appearing out of the blind area 40 can be understood in an overhead-view manner, so that the work machine can be operated safely.

(iii) According to the third embodiment, the information presentation device generates the third synthesized overhead-view image (Overhead-view image 5) by reflecting the in-vehicle overhead-view image generated based on the image captured by the in-vehicle imaging device installed in the work machine 1 in the second synthesized overhead-view image (Overhead-view image 4), and then outputs the third synthesized overhead-view image. In this way, the area of the blind area 40 can be reduced, so that the work machine can be maneuvered safely.

(iv) The functions of the embodiments of the present disclosure may be implemented by the program code of software. In this case, a storage medium having the program code recorded therein may be provided to a system or a device, and a computer (or a CPU or an MPU) of the system or the device may read out the program code stored in the storage medium. In this case, the program code per se read out from the storage medium implements the above-described functions of the embodiments, and the program code per se and the storage medium having the same stored therein constitute the present disclosure. Examples of the storage medium for supplying such program code include a flexible disc, a CD-ROM, a DVD-ROM, a hard disk, an optical disk, a magneto optical disk, a CD-R, magnetic tape, a non-volatile memory card, and a ROM.

Further, based on the instructions of the program code, some or all of actual processes may be executed by an operating system (OS), for example, running on a computer, and the above-described functions of the embodiments may be implemented by the processes. Further, the program code read from the storage medium may be written to a memory on the computer, and then, based on the instructions of the program code, some or all of actual processes may be executed by the CPU of the computer, for example, and the above-described functions of the embodiments may be implemented by the processes.

Further, the program code of software for implementing the functions of the embodiments may be delivered via a network, and stored in a storage means such as a hard disk or a memory of the system or device, or in a storage medium such as a CD-RW or a CD-R. In use, the computer (or a CPU or an MPU) of the system or device may read and execute the program code stored in the storage means or the storage medium.

Finally, it is to be understood that the processes and technologies discussed herein are substantially not related to any specific device, and may be implemented by any appropriate combination of components. Further, various types of general-purpose devices may be used in accordance with the teachings described herein. It may also be beneficial to construct a dedicated device to perform the steps described herein.

While the present disclosure has been described with reference to specific examples, these are for the purpose of illustration and not for limitation in all aspects. It will be apparent to those skilled in the relevant art that there is a number of combinations of hardware, software, and firmware suitable for implementing the technologies of the present disclosure. For example, the described software may be implemented by a wide variety of programs or script languages, such as assembler, C/C++, perl, Shell, PHP, and Java (registered trademark).

Further, in the above-described embodiments, the control lines and information lines that are indicated are those considered necessary for illustrative purposes, and not all control lines or information lines of a product are necessarily indicated. All configurations may be interconnected.

While the embodiments of the present disclosure have been described, the subject matter of the present disclosure is not limited to the contents of the respective embodiments, and various design modifications may be made without departing from the spirit and scope set forth in the claims. For example, the foregoing embodiments are described in detail for the purpose of facilitating an understanding the technology of the present disclosure, and are not necessarily limited to those comprising all of the configurations described. A part of the configuration of a certain embodiment may be replaced with the configuration of another embodiment, or the configuration of another embodiment may be added to the configuration of one embodiment. Further, with respect to part of the configuration of each embodiment, it is possible to add, delete, or substitute another configuration.

REFERENCE SIGNS LIST

1 Work machine
25 Current terrain information acquisition unit
26 Original terrain information acquisition unit
27 Overhead-view imaging processing unit
28 Overhead-view image synthesis unit
29 Display unit (display device)
30 Fixed obstacle
31 Construction site
32 Outside of construction site
33 Imaging device
38 Determination unit
39 Blind area computation unit
43 Vehicle body orientation angle computation unit
44 Vehicle body position detection unit
45 In-vehicle overhead-view image creating unit
46 In-vehicle overhead-view image correction unit
47 Display switching unit
49 Communication unit (communication device)

The invention claimed is:

1. An information presentation device for generating and outputting a terrain image relating to a construction site, comprising
    a storage device that stores a program for performing a predetermined imaging process on the terrain image,
    a processor for reading the program from the storage device and generating the terrain image, and
    a display unit that displays the terrain image generated by the processor,
    wherein the processor performs:
    a process of using an image of the construction site acquired by at least one imaging device installed at the construction site, to acquire a first overhead-view image representing a current terrain of the construction site as viewed from above;
    a process of acquiring a second overhead-view image acquired by a method other than capturing by the imaging device installed at the construction site, and representing an overall terrain of the construction site prior to construction as viewed from above; and an image synthesis process of superimposing the first overhead-view image over the second overhead-view image to generate a first synthesized overhead-view image, and wherein the processor transmits the generated first synthesized overhead-view image to the display unit.

2. The information presentation device according to claim 1, wherein the processor further performs a process of computing information for identifying a blind area at the construction site based on the first overhead-view image, and during the image synthesis process, the processor further generates an image of the blind area from the information for identifying the blind area, and generates a second synthesized overhead-view image in which the image of the blind area is reflected in the first synthesized overhead-view image.

3. The information presentation device according to claim 2, wherein the processor uses the first overhead-view image to compute a presence or absence of the blind area, a position of the blind area, and an area of the blind area as the information for identifying the blind area.

4. The information presentation device according to claim 3, wherein the processor further performs a process of determining whether information necessary for operating a work machine at the construction site has been acquired, based on the information for identifying the blind area.

5. The information presentation device according to claim 4, wherein the processor determines that the information necessary for operating the work machine at the construction site has been acquired if a distance from the work machine to the blind area is greater than a first threshold value and the area of the blind area is less than a second threshold value.

6. The information presentation device according to claim 5, wherein the processor performs a process of outputting warning if it is determined that the information necessary for operating the work machine has not been acquired.

7. The information presentation device according to claim 2, wherein the processor further performs a process of generating a third synthesized overhead-view image in which an image captured by an in-vehicle imaging device installed on a work machine operating at the construction site is reflected in the second synthesized overhead-view image.

8. The information presentation device according to claim 7, wherein the processor further switches and outputs the third synthesized overhead-view image and the image captured by the in-vehicle imaging device, in response to a display switching instruction.

* * * * *